R. H. ATCHESON.
TIRE CASING VULCANIZING MOLD.
APPLICATION FILED JULY 1, 1921.

1,406,433.

Patented Feb. 14, 1922.
2 SHEETS—SHEET 1.

Inventor
Robert H. Atcheson

By Howard E. Barlow
Attorney

R. H. ATCHESON.
TIRE CASING VULCANIZING MOLD.
APPLICATION FILED JULY 1, 1921.
1,406,433.
Patented Feb. 14, 1922.
2 SHEETS—SHEET 2.
Fig. 3
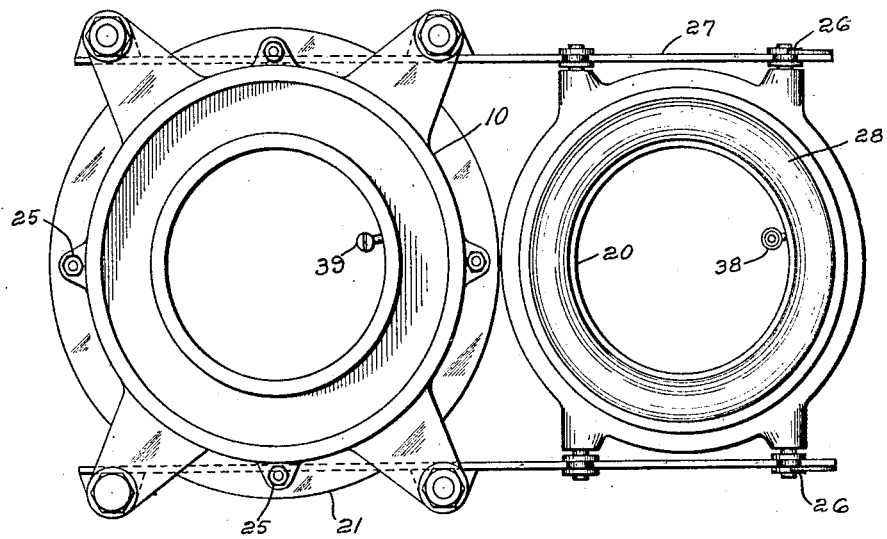
Fig. 4
Fig. 5
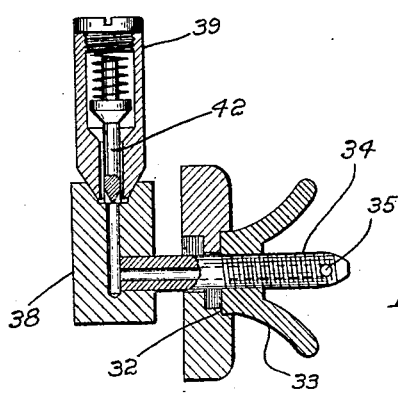
Fig. 6
Inventor
Robert H. Atcheson
By Howard E. Barlow
Attorney

UNITED STATES PATENT OFFICE.

ROBERT H. ATCHESON, OF HARTFORD, CONNECTICUT, ASSIGNOR TO HENRY J. DOUGHTY, OF PROVIDENCE, RHODE ISLAND.

TIRE-CASING-VULCANIZING MOLD.

1,406,433.  Specification of Letters Patent.  Patented Feb. 14, 1922.

Application filed July 1, 1921. Serial No. 481,737.

*To all whom it may concern:*

Be it known that I, ROBERT H. ATCHESON, a citizen of the United States, residing at Hartford, in the county of Hartford and State of Connecticut, have invented certain new and useful Improvements in Tire-Casing-Vulcanizing Molds, of which the following is a specification.

This invention relates to certain new and useful improvements in apparatus for vulcanizing tire casings and the like; and the object of this invention is to provide an improved form of sectional mold for performing this vulcanizing operation, the same being provided with a separate bead ring forming the inner or rim diameter of the casing sets, and to arrange this ring so that it may be withdrawn with the lower mold section from operative position whereby the casing may be accurately positioned on this ring before the side-mold parts are brought together, thereby effectually avoiding any possibility of trapping or pinching any portion of the casing in moving the mold parts to closed position.

A further object of the invention is to provide a heating chamber for the tread portion of the casing and form the inner surface of this chamber beveled both upwardly and downwardly from its longitudinal center whereby this chamber member is adapted to hold the upper side-mold portion to the press while the lower mold portion is being removed therefrom; also the lower beveled portion of this chamber may serve to center the lower mold portion so the mold parts are being brought together.

With these and other objects in view, the invention consists of certain novel features of construction, as will be more fully described, and particularly pointed out in the appended claims.

In the accompanying drawings,

Figure 3 is a plan view of the parts as shown in Figure 1.

Figure 4 is a detail of the bead ring partly broken away and showing the peripheral groove and its overlapping meeting edges.

Figure 5 is a detail showing the slotted edge of the bead ring to receive the steam stem.

Figure 6 is an enlarged view of the steam connection to the interior of the casing.

Figure 1:
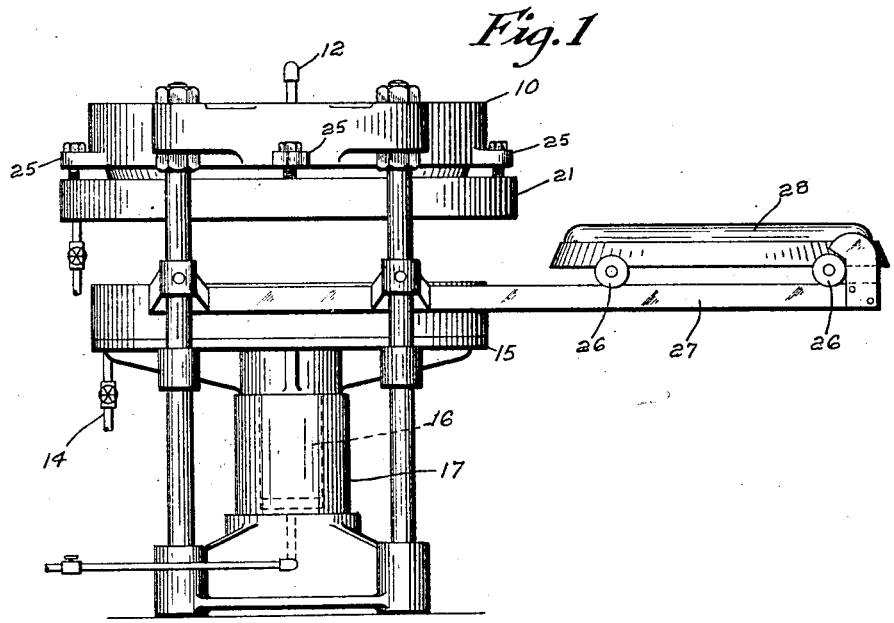
Figure 1 is a side elevation of my improved mold apparatus showing the lower heating chamber in dropped position and the casing with its lower mold section rolled out on the track to receive the casing.
Figure 2:
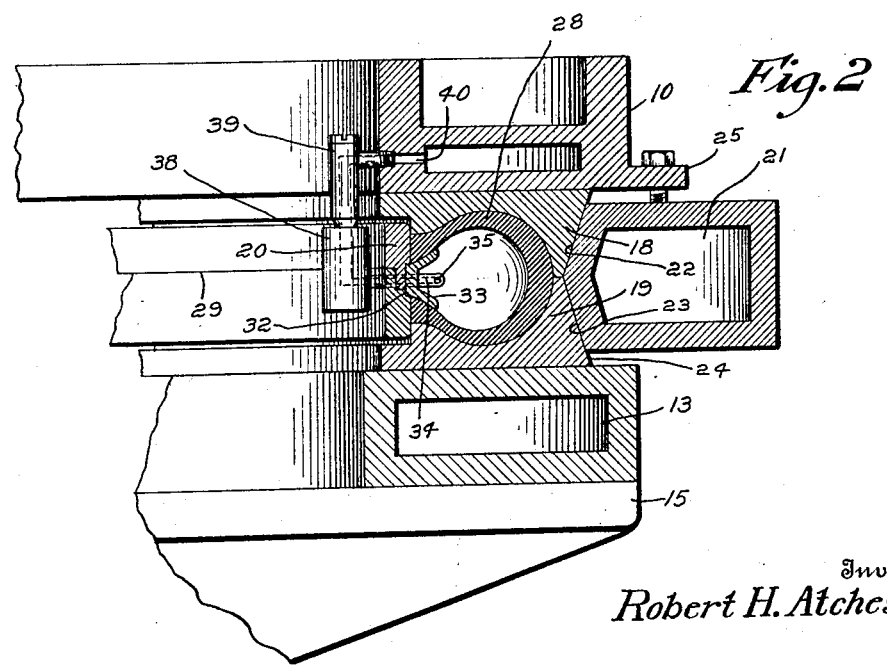
Figure 2 is an enlarged sectional view through the parts when in operative position.

With reference to the drawings, 10 designates the upper platen of the vulcanizing press in which is formed an annular chamber 11 which is supplied with steam at the necessary vulcanizing temperature or pressure through a supply pipe 12, a lower chamber 13 being also supplied with steam through the pipe 14.

This lower chamber is shown as being mounted on a table 15 which is supported on a hydraulic piston 16 in the cylinder 17 whereby this lower chamber may be lowered to permit the withdrawal of the lower mold member, presently described, to receive the work.

The mold in which the work is vulcanized is preferably constructed of three parts, an upper mold section 18, a lower mold section 19 and a bead ring 20. In addition to the upper and lower steam chambers for heating the opposite sides of the work I have provided a third ring-shaped member 21 for heating the tread portion of the tire. The inner periphery of this member is preferably beveled back as at 22 from its internal periphery upwardly to engage the correspondingly inclined face on the periphery of the upper mold portion, and is also correspondingly beveled on its lower half as at 23 to engage the corresponding face 24 of the lower half of the mold ring 19 to accurately center the same when the mold parts are brought together.

In order to secure the upper half of the mold ring to the upper fixed platen of the press, I bolt the two together through the plurality of ears 25 on this upper platen and by the engagement of their beveled edges this steam ring serves to also bind this mold thereto.

The lower mold half 19 is provided with wheels 26 which when the table 16 is lowered will engage the track 27 permitting this portion of the mold to be rolled out of the press on the track into position to facilitate the removing of the work 28 and repositioning the same therein.

The bead ring 20 performs an important function in the construction of my improved sectional mold as it is adapted to be moved with the lower mold half 19 and the work when the table 15 is lowered. This ring is preferably split longitudinally as at 29, the upper and lower halves being provided with overlapping portions 30 at their meeting edges so as to accurately centralize the parts relative to each other. The outer surface of this ring is grooved as at 31 into which the portion 32 of the sealing ring 33 is seated. By which construction is is necessary to form the bead ring in two parts as shown.

This sealing ring 33 is positioned inside of the tire so as to close the joint at the bead when pressure is applied to the inner surface of the casing.

It will be seen that by my improved construction of sectional mold when the lower mold portion is moved out of the press into the position illustrated in Figures 1 and 3 that in order to position the casing therein it is only necessary to insert the sealing ring into the casing then position the bead ring halves onto the inwardly-projecting base portion 32 of this sealing ring. By which construction it will be seen that the work may be mounted on both the bead ring and the sealing ring and placed in the lower mold section while the latter is withdrawn from the press, the whole may then be rolled inwardly on the track into position beneath the upper section of the mold and then by applying pressure to the piston 16 the table 15 with its steam chamber and mold parts will be raised positioning the lower mold parts against the upper mold parts and this may now be done as the casing is all set in the lower mold parts without any possibility of trapping or pinching any portion of the casing in the mold parts while moving these parts to closed position which is not the case with other molds now in use.

In order to conduct steam pressure into the casing I have provided a stem 34 which extends through the tread ring and sealing ring into the casing, the inner end of this stem being provided with side openings 35 looking in opposite directions so as to direct the incoming pressure circularly about the chamber. The overlapping portions of the bead ring are preferably slotted as at 36, see Figure 5, permitting the separation of these ring parts.

To this stem I have attached a channel member 38 which is adapted to receive the tapered end of the upper inlet member 39 connected through the port 40 to the chamber 11, this member being provided with an air control valve 42, whereby when the mold parts are brought together the pressure connection to the upper chamber may be automatically made, opening this shut-off valve thereby permitting the steam pressure from the chamber 11 to pass into the casing.

When the vulcanizing operation has been finished it is only necessary to cause the table 15 to drop, roll the lower mold parts out onto the ways 27 withdraw the work from the bead ring and seal ring and insert fresh work as above described and repeat the operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a tire casing vulcanizer, a sectional mold comprising two separable side mold sections, a sealing ring located at the bead portion within the casing, and a separate bead ring forming the inner section of the mold and the outer periphery of which engages and determines the inner or rim diameter of the casing.

2. In a tire casing vulcanizer, a sectional mold comprising two separable side mold sections, a separate bead ring forming the inner section of the mold, the outer periphery of which engages and determines the inner or rim diameter of the casing, and an inner sealing ring supported on said bead ring.

3. In a tire casing vulcanizer, a sectional mold comprising two separable side mold sections, a separate bead ring formed in longitudinally separable sections to provide the inner section of the mold and determine the inner or rim diameter of the casing, and an inner sealing ring having means for centering it on said bead ring.

4. In a tire casing vulcanizer, a sectional mold comprising two separable side mold sections, a separate bead ring formed in longitudinally separable sections to provide the inner section of the mold, the outer surface of said ring being provided with a groove, and an inner sealing ring adapted to fit into said groove and so be supported in said ring.

5. In a tire casing vulcanizer, a sectional mold comprising two separable side mold sections, a separate bead ring formed in longitudinally separable sections having cooperating interengaging meeting edges, said ring providing the inner section of the casing mold and determining the inner or rim diameter of the casing, and an inner sealing ring supported on said bead ring.

6. In a tire casing vulcanizer, a sectional mold comprising two separable side mold sections, a sealing ring located at the bead portion within the casing, a separate bead ring forming the inner section of the mold and the outer periphery of which engages and determines the inner or rim diameter of the casing to register with each other when brought together.

7. In a tire casing vulcanizer, a sectional mold comprising two separable side mold sections, a sealing ring located at the bead portion within the casing, a separate bead ring forming the inner section of the mold and the outer periphery of which engages and determines the inner or rim diameter of the casing, and heating chambers for the upper and lower and tread portions of the mold.

8. In a tire casing vulvanizer, a sectional mold comprising two separable side mold sections, a sealing ring located at the bead portion within the casing, a separate bead ring forming the inner section of the mold and the outer periphery of which engages and determines the inner rim diameter of the casing, heating chambers for the upper and lower and tread portions of the mold, and means for automatically connecting the steam pressure supply to the interior of the casing when the mold parts are brought together.

In testimony whereof I affix my signature.

ROBERT H. ATCHESON.